United States Patent
Asahara et al.

(10) Patent No.: US 12,331,368 B2
(45) Date of Patent: *Jun. 17, 2025

(54) METHOD FOR PRODUCING CHROMIUM-CONTAINING MOLTEN IRON

(71) Applicant: NIPPON STEEL CORPORATION, Tokyo (JP)

(72) Inventors: Norifumi Asahara, Tokyo (JP); Katsuhiko Kato, Tokyo (JP); Mikio Futaka, Tokyo (JP); Yasuhiro Tanaka, Tokyo (JP); Naoki Kaneko, Tokyo (JP); Junichi Nakagawa, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 816 days.

This patent is subject to a terminal disclaimer.

(21) Appl. No.: 17/603,592

(22) PCT Filed: Mar. 31, 2020

(86) PCT No.: PCT/JP2020/014961
§ 371 (c)(1),
(2) Date: Oct. 14, 2021

(87) PCT Pub. No.: WO2020/213393
PCT Pub. Date: Oct. 22, 2020

(65) Prior Publication Data
US 2022/0195545 A1    Jun. 23, 2022

(30) Foreign Application Priority Data
Apr. 19, 2019 (JP) .................................. 2019-080179

(51) Int. Cl.
*C21C 5/54* (2006.01)
*C21C 5/52* (2006.01)
(Continued)

(52) U.S. Cl.
CPC ............ *C21C 7/0006* (2013.01); *C21C 5/527* (2013.01); *C21C 5/54* (2013.01); *C21C 7/0025* (2013.01); *C22C 33/04* (2013.01)

(58) Field of Classification Search
CPC ..... C21C 5/005; C21C 5/4673; C21C 5/5217; C21C 5/527; C21C 5/54; C21C 7/0006;
(Continued)

(56) References Cited

U.S. PATENT DOCUMENTS 5,028,388 A * 7/1991 Tada .................. C21C 5/005
                                                              420/583
2010/0037728 A1    2/2010 Sugitatsu et al.
2022/0195546 A1*   6/2022 Asahara ................ C21C 7/0006

FOREIGN PATENT DOCUMENTS

JP    2004-137572 A    5/2004
JP    2004-211179 A    7/2004
(Continued)

OTHER PUBLICATIONS

"Stainless steel type 0Cr18Ni9 was oxygen blown with 100% return material in electric arc furnace", Dunillow, Large Cast Forging, No. 3, pp. 34-39, 1991, China Academic Journal Electronic Publishing House, pub. Sep. 25, 1993.
(Continued)

*Primary Examiner* — Jie Yang
(74) *Attorney, Agent, or Firm* — SOLARIS Intellectual Property Group, PLLC

(57) ABSTRACT

A charged material containing alloy iron of at least one of ferrochrome containing metallic Si or ferrosilicon, and unreduced slag containing Cr oxide generated by oxidative refining, is charged into an electric furnace as a mixture in which a mass ratio of a metallic Si amount to a Cr oxide amount is from 0.30 to 0.40, and a C concentration is in a range of from 2.0% by mass to a saturation concentration, and molten iron containing Cr obtained due to the Cr oxide (Continued)

undergoing reduction processing is produced, such that, when the charged material is heated and melted in the electric furnace, an attainment temperature is set to from 1400° C. to 1700° C., a maximum average heating rate in any 80° C. interval from 1300° C. to the attainment temperature is set to 15.0° C./min or less, and a minimum average heating rate in any 80° C. interval from 1300° C. to the attainment temperature is set to 3.0° C./min or greater.

20 Claims, 4 Drawing Sheets

(51) Int. Cl.
    *C21C 7/00*     (2006.01)
    *C22C 33/04*     (2006.01)

(58) Field of Classification Search
    CPC ....... C21C 7/0025; C22C 33/04; C22B 34/32; C22B 7/04
    See application file for complete search history.

(56) References Cited

FOREIGN PATENT DOCUMENTS

| | | |
|---|---|---|
| JP | 3721154 B2 | 11/2005 |
| JP | 2010-90428 A | 4/2010 |
| JP | 2010-242128 A | 10/2010 |
| JP | 2016-151036 A | 8/2016 |
| JP | 2016-194126 A | 11/2016 |
| JP | 2018-003063 A | 1/2018 |

OTHER PUBLICATIONS

Office Action in Chinese application No. 202080030237.8, corresponding to the present application, issued by the SIPO on May 20, 2022.

* cited by examiner

METHOD FOR PRODUCING CHROMIUM-CONTAINING MOLTEN IRON

TECHNICAL FIELD

The present disclosure relates to a method for producing chromium-containing molten iron.

BACKGROUND ART

Conventionally, a technique for producing molten iron containing a large amount of chromium (Cr) using an electric furnace or the like to smelt stainless steel is known. In the production of such chromium-containing molten iron, when oxygen is blown into the molten iron to perform decarburization processing, C is oxidized and removed as carbon monoxide, while Cr is incorporated into slag as Cr oxide (chromium oxide).

In order to efficiently smelt stainless steel, it is required to reduce a generation amount of chromium oxide and to reduce a slag generation amount.

Patent Document 1 discloses a technique of refluxing converter slag to an electric furnace and reducing it in the electric furnace. According to this technique, it is described that metallic chromium can be sufficiently recovered.

Further, Patent Document 2 discloses a technique for reducing chromium in an electric furnace without using an F-containing substance such as fluorite or the like. According to this technique, it is described that metallic chromium can be effectively reduced and recovered from chromium oxide.

Furthermore, Patent Document 3 discloses a method of recovering chromium from chromium-containing slag in which a size of the slag, a temperature of molten iron after reduction processing, a relationship between a C concentration and an Si concentration in the molten iron, and a relationship between a CaO concentration, an $SiO_2$ concentration and an $Al_2O_3$ concentration in the slag after the reduction processing are defined.

PRIOR ART DOCUMENTS

Patent Documents

Patent Document 1: Japanese Patent Application Laid-open No. 2010-242128
Patent Document 2: Japanese Patent Application Laid-open No. 2010-90428
Patent Document 3: Japanese Patent Application Laid-open No. 2016-194126

SUMMARY OF THE INVENTION

Problem to be Solved by the Invention

Each of the techniques described in Patent Documents 1 and 2 can suppress a slag generation amount that is discharged to the outside of the system, but the amount of slag reduction is insufficient from the viewpoint of societal demand for environmental friendliness. In addition, as demand for stainless steel products increases, it is also required to be able to efficiently recover chromium. In Patent Document 3, chromium is efficiently reduced from slag, but it is desirable for efficient recovery of chromium and reduction of the slag generation amount to be able to be achieved at the same time.

In view of the above-mentioned problems, the present disclosure aims to provide a method for producing chromium-containing molten iron that is capable of efficiently reducing unreduced slag containing chromium oxide generated by oxidative refining to recover chromium and suppressing a generation amount of slag.

Means for Solving the Problem

The gist of the present disclosure is as follows.
<1> A method for producing chromium-containing molten iron, the method including:
charging, into an electric furnace, a charged material containing a metal raw material of at least one of ferrochrome containing metallic Si or ferrosilicon, and unreduced slag containing Cr oxide generated by oxidative refining, as a mixture in which a mass ratio of a metallic Si amount to a Cr oxide amount is from 0.30 to 0.40, and a C concentration is in a range of from 2.0% by mass to a saturation concentration; and
producing molten iron containing Cr obtained due to the Cr oxide undergoing reduction processing, such that, when the charged material is heated and melted in the electric furnace, an attainment temperature is set to from 1400° C. to 1700° C., a maximum average heating rate in any 80° C. interval from 1300° C. to the attainment temperature is set to 15.0° C./min or less, and a minimum average heating rate in any 80° C. interval from 1300° C. to the attainment temperature is set to 3.0° C./min or greater.
<2> The method for producing chromium-containing molten iron according to <1>, in which:
the charged material includes a carbon source, a silicon source, a CaO source, and an $Al_2O_3$ source, and, among the charged material, material other than the metal raw material is an auxiliary raw material;
a content of the auxiliary raw material having a sieve mesh size of over 25 mm is 5% by mass or greater and 30% by mass or less with respect to the entire charged material, and a content of the auxiliary raw material having a sieve mesh size of under 3.15 mm is 3.0% by mass or greater with respect to the entire charged material; and
the charged material is charged into the electric furnace such that the C concentration and an Si concentration in the molten iron after the reduction processing satisfy conditions of the following formula (1), and such that a relationship between a CaO concentration, an $SiO_2$ concentration and an $Al_2O_3$ concentration in the slag after the reduction processing satisfies conditions of the following formula (2):

$$[C] \geq -29.4 + 0.015 \times (T+273) - 0.003 \times (T+273) \times \log [Si] \qquad (1)$$

$$0.04 \leq (CaO)/\{(SiO_2) \times (Al_2O_3)\} \leq 0.20 \qquad (2)$$

in which, [C] and [Si] respectively represent the C concentration in % by mass and the Si concentration in % by mass, in the molten iron after the reduction processing, (CaO), ($SiO_2$) and ($Al_2O_3$) respectively represent the CaO concentration in % by mass, the $SiO_2$ concentration in % by mass, and the $Al_2O_3$ concentration in % by mass, in the slag after the reduction processing, and T represents the attainment temperature (° C.).
<3> The method for producing chromium-containing molten iron according to <2>, in which a fluorine concentration, in terms of $CaF_2$ equivalent, in the slag after the reduction processing is 0.5% by mass or less, and the $Al_2O_3$ concentration is 5.0% by mass or greater and 30.0% by mass or less.

<4> The method for producing chromium-containing molten iron according to any one of <1> to <3>, in which 0.12 or more stirring gas blowing plugs per 1 $m^2$ of molten metal surface area are arranged at a furnace bottom of the electric furnace, and, when a distance between centers of adjacent stirring gas blowing plugs is designated as L, and a molten metal depth from the furnace bottom to the molten metal surface is designated as H, L/H is 0.50 or greater.

<5> The method for producing chromium-containing molten iron according to any one of <1> to <4>, in which:

the electric furnace includes three electrodes; and viewing the electric furnace in a planar view from a central axis direction, a furnace center is arranged at a center of gravity of a triangle having respective centers of the three electrodes as vertices, and, viewing the electric furnace in a planar view from the central axis direction and assuming band regions each having a virtual line extending from the furnace center through a center of a respective one of the three electrodes to a furnace wall as a center line and having a diameter of the electrode as a width, the stirring gas blowing plugs are positioned at a furnace bottom region excluding the band regions.

<6> The method for producing chromium-containing molten iron according to any one of <1> to <5>, in which a stirring power density during operation of the electric furnace is 0.01 kW/ton or greater and 1.0 kW/ton or less.

<7> The method for producing chromium-containing molten iron according to any one of <1> to <6>, in which the charged material that is charged into the electric furnace is melted such that a maximum attainment temperature for a surface temperature of a refractory furnace wall of the electric furnace in one charge is 1000° C. or higher and 1800° C. or lower, and such that, when the surface temperature of the refractory furnace wall is in a range of 1000° C. or higher and 1800° C. or lower, a heat flux from a surface of the refractory furnace wall to a furnace main body interior is 150 $Mcal/m^2/hr$ or less.

Effect of the Invention

According to the present disclosure, it is possible to provide a method for producing chromium-containing molten iron that is capable of efficiently reducing unreduced slag containing chromium oxide generated by oxidative refining to recover chromium and suppressing a generation amount of slag.

MODE FOR CARRYING OUT THE INVENTION

Hereinafter, embodiments of the present disclosure will be described with reference to the drawings.

In the present specification, a numerical range expressed by using "to" means a range including the numerical values described before and after "to" as a lower limit value and an upper limit value. Further, a numerical range in a case in which "greater than" or "less than" is added to numerical values described before or after "to" means a range in which these numerical values are not included as the lower limit value or the upper limit value.

In numerical ranges that are described stepwise in the present specification, an upper limit value or a lower limit value of a numerical range that is described stepwise may be replaced with an upper limit value or a lower limit value of another numerical range that is described stepwise, and also may be replaced with a value shown in the examples.

Further, with regard to a content of a component, "%" means "% by mass".

Figure 1:
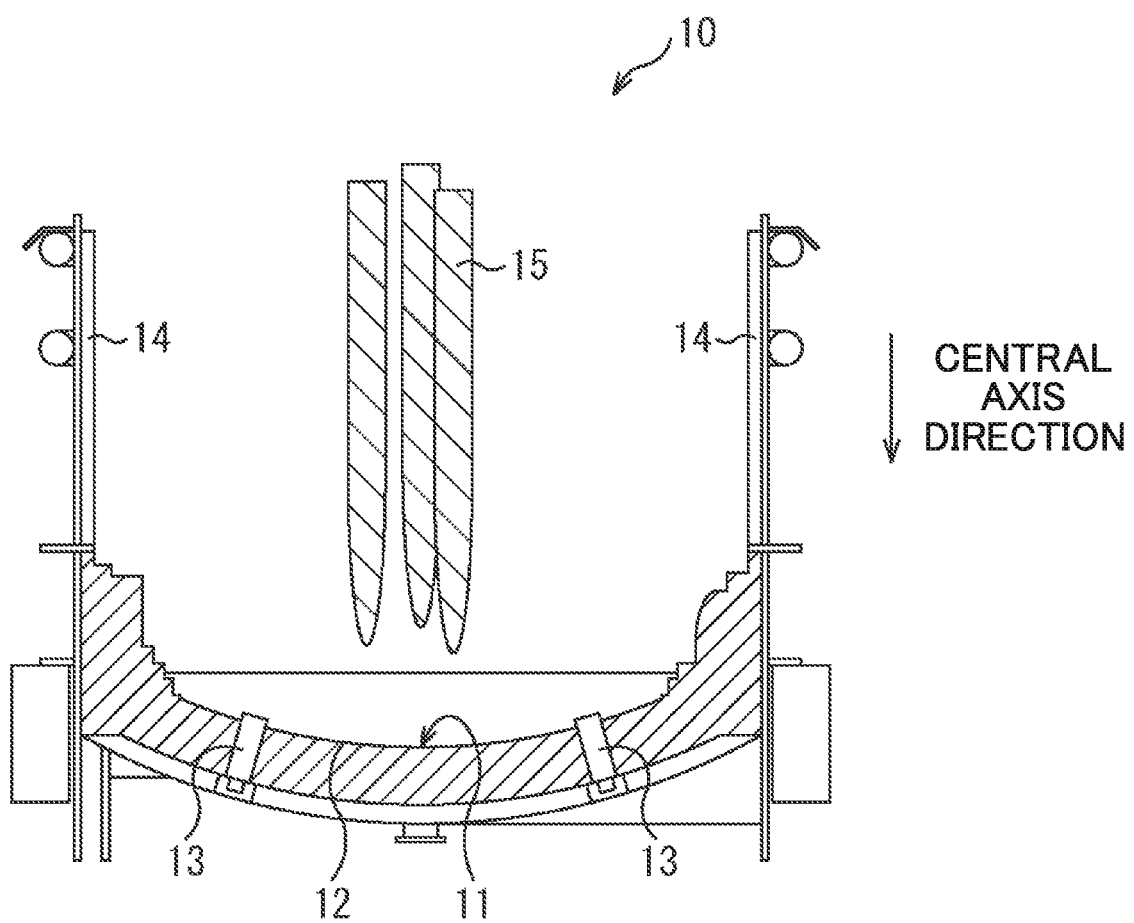
FIG. 1 is a vertical cross-sectional view showing an example of an arc-type electric furnace for producing chromium-containing molten iron.

FIG. 1 is a vertical cross-sectional view of an electric furnace for producing chromium-containing molten iron in the present embodiment. Hereinafter, the detailed structure of the electric furnace used in the present embodiment will be described.

The electric furnace 10 used in the present embodiment is an arc-type electric furnace having three electrodes as shown in FIG. 1. Although the details will be described later, in the present embodiment, as material charged into the electric furnace, unreduced slag containing chromium oxide generated by oxidative refining such as, for example, a separate charge of converter slag that has been generated by decarburizing chromium-containing molten iron in a converter, which is a subsequent process, ferrochrome containing metallic Si and/or ferrosilicon, as a metal raw material, and, in accordance with necessity, other auxiliary raw materials and the like are charged into the electric furnace 10, and Cr oxide contained in the unreduced slag is reduced with metallic Si derived from the ferrochrome and/or the ferrosilicon, whereby chromium-containing molten iron is produced.

A plurality of stirring gas blowing plugs 13 are installed at a furnace bottom 12 of the electric furnace 10, a number of the stirring gas blowing plugs 13 is set to 0.12 or greater per 1 $m^2$ of molten metal surface area, and, when a distance between centers of adjacent stirring gas blowing plugs 13 is designated as L, and a molten metal depth from the furnace bottom 12 to the molten metal surface is designated as H, L/H is preferably set to 0.50 or greater. This makes it possible to further improve the efficiency of reduction and recovery of chromium oxide.

Here, the molten metal surface area is an area of the molten metal surface when the electric furnace 10 is viewed in a planar view from above. Further, the distance L between centers of adjacent stirring gas blowing plugs 13 is a horizontal distance. In a case in which the furnace bottom 12 is not flat, the molten metal depth H is an average value of molten metal depths at two adjacent plug positions. Generally, the molten metal depth H is 50 cm or greater, and a maximum value is about 2 m in a large electric furnace.

Due to stirring of the molten metal, contact of the molten metal with unmelted charged material is correspondingly promoted, and heating and melting of the charged material is promoted. However, since the electric furnace 10 is a shallow bath, stirring efficiency is low, and there is a limit to the range in which the molten metal can be well stirred by one stirring gas blowing plug 13. In order to promote the stirring of the molten metal, it is also conceivable to increase a stirring gas flow rate per one of the stirring gas blowing plugs 13, but when the flow rate of the stirring gas exceeds a certain limit value, the stirring gas that blows through the molten metal is remarkable, and it becomes difficult for a portion of the blown stirring gas to be used for stirring.

Thus, in the present embodiment, it is preferable to set the number of stirring gas blowing plugs 13 per 1 $m^2$ of molten metal surface area in the above-described range. It should be noted that the "number of stirring gas blowing plugs 13 per 1 $m^2$ of molten metal surface area" is the number of stirring gas blowing plugs 13 divided by the molten metal surface area at a time of operation. Due to this, an area of a weakly stirred region is reduced, the entirety of the molten metal is well stirred, and as a result, contact between the charged material and the molten metal is promoted, and heating and melting of the charged material are promoted. It should be noted that there is a physical upper limit value for the number of stirring gas blowing plugs to be installed (installation space), and generally, about 0.5 per 1 $m^2$ of molten metal surface area is considered to be the upper limit.

Furthermore, the effects of the distance between adjacent stirring gas blowing plugs and the molten metal depth on stirring of the molten metal will be explained.

Figure 2:
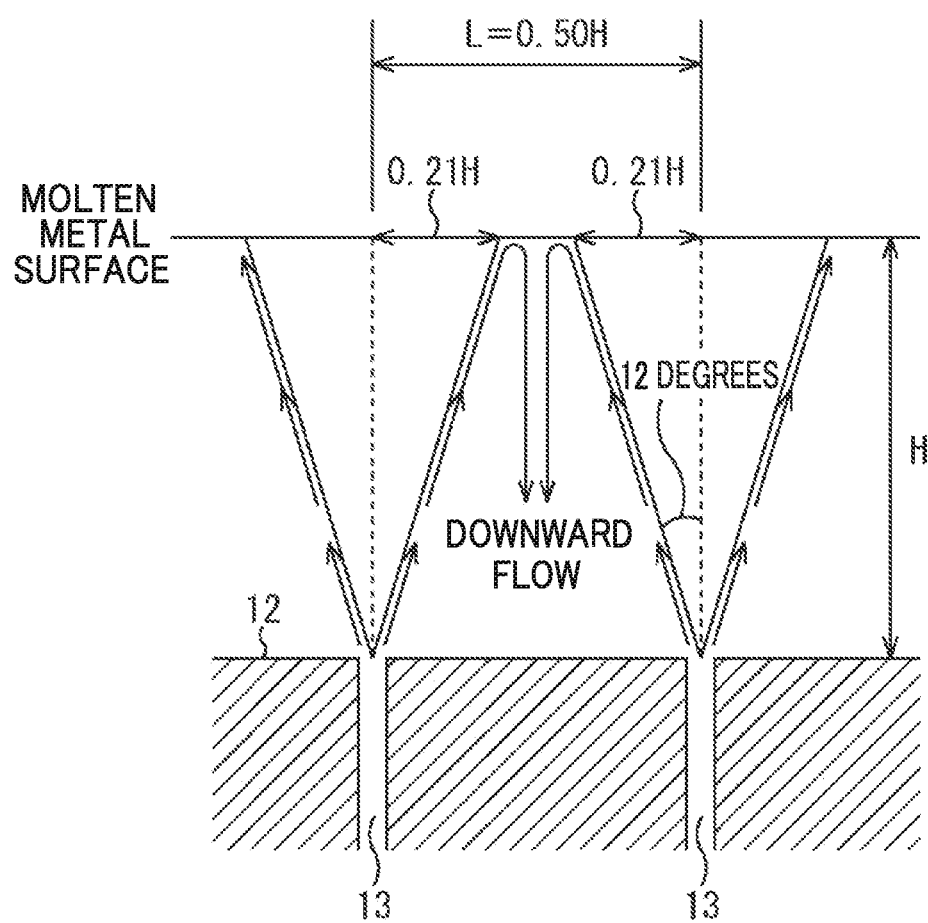
FIG. 2 is a schematic view for explaining an example of a flow of stirring gas that is blown into a furnace from a stirring gas blowing plug.

For spreading of molten metal due to stirring gas blown into the molten metal from stirring gas blowing plugs installed at a furnace bottom, it is known that, as shown in FIG. 2, a spreading radius of the molten metal is 0.21×a molten metal depth H. It should be noted that a spreading angle of the stirring gas with respect to a vertical line is generally 12 degrees.

In order to prevent spreading of the molten metal surface due to the stirring gas blown into the furnace from two adjacent stirring gas blowing plugs 13 from interfering with each other, it is conceivable to set the distance L between centers of adjacent stirring gas blowing plugs to greater than 0.42H (=0.21H×2) as shown in FIG. 2. Furthermore, when the distance L between centers of adjacent stirring gas blowing plugs is increased to 0.50H, a gap is generated between two spreadings of the molten metal surface, and a downward flow is generated. Accordingly, it is preferable that the distance L between centers of adjacent stirring gas blowing plugs is set to 0.50H or greater, that is to say, that L/H is set to 0.50 or greater. Although an upper limit value of L/H does not need to be set in particular, a physical upper limit value of L/H exists and is generally about 5.

Figure 3:
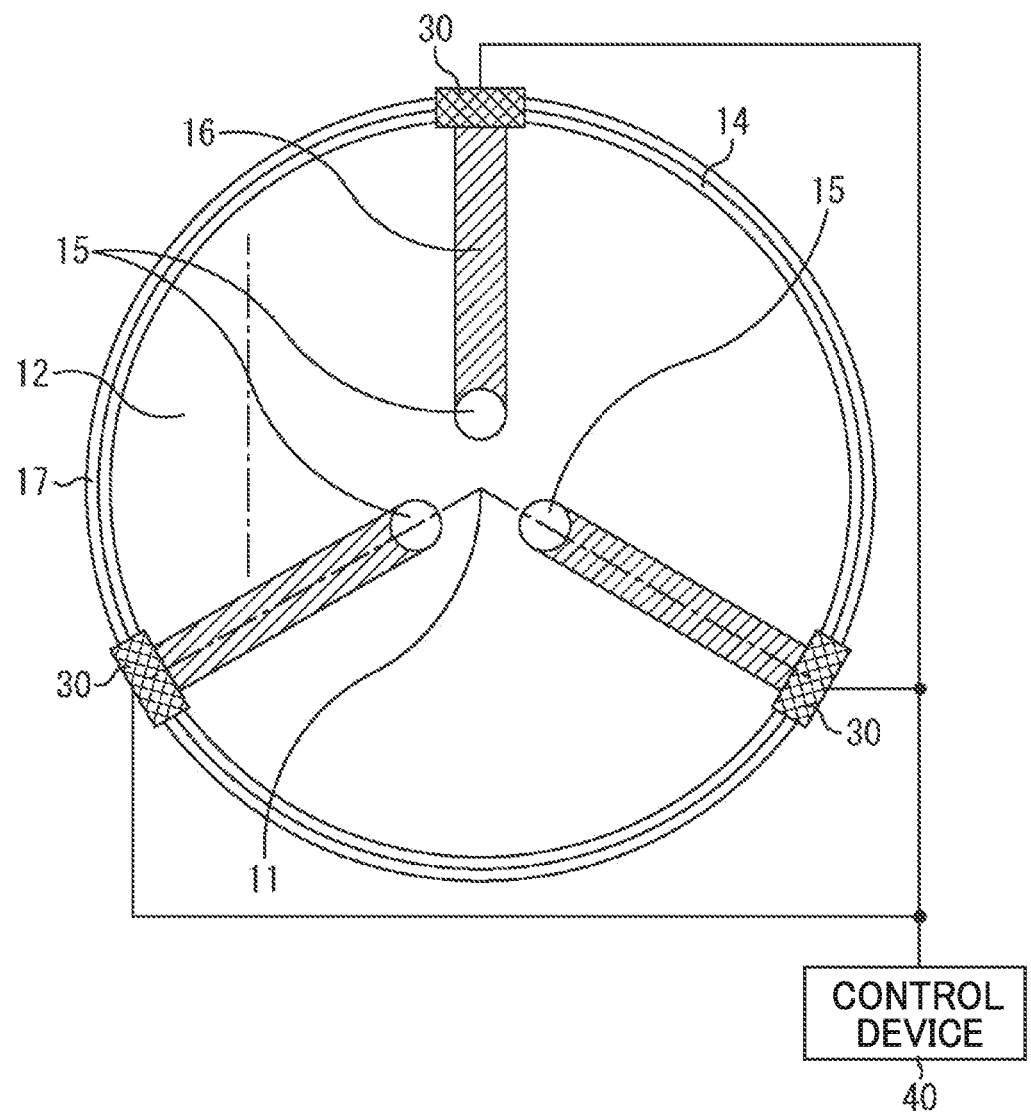
FIG. 3 is a view for explaining an outline seen from a furnace central axis in an example of an arc-type electric furnace.

Further, in the operation method of the electric furnace in the present embodiment, as shown in FIG. 3, it is preferable that, viewing the electric furnace 10 in a planar view from a central axis direction, a furnace center 11 is arranged at a center of gravity of a triangle having respective centers of three electrodes 15 as vertices, and furthermore that, viewing the electric furnace 10 in a planar view and assuming band regions 16 each having a virtual line extending from the furnace center 11 through a center of an electrode 15 to a refractory furnace wall 14 as a center line and having a diameter of the electrode as a width, the stirring gas blowing plugs 13 are arranged at the furnace bottom region excluding the band regions 16.

Generally, an electromagnetic force is generated between conductors in which currents flow in parallel. In a three-phase electrode, an outward electromagnetic force acts in an arc with respect to an electrode circle. For this reason, the arc is tilted toward a furnace wall rather than vertically. The arc directed to the furnace wall blows an arc jet flow of high-temperature gas onto the furnace wall along a virtual line extending from the furnace center through the center of the electrode to the furnace wall. This arc jet flow flowing at high speed on a surface layer portion of a molten metal bath surface imparts a shearing force to the molten metal bath surface, and a molten metal flow along the arc jet flow is generated.

Accordingly, it is preferable that the stirring gas blowing plugs are arranged in a region in which they do not disturb the molten metal flow due to the arc jet flow, that is to say, the furnace bottom region excluding the band regions each having the virtual line extending from the furnace center through a center of an electrode to the furnace wall as a center line and having a diameter of the electrode as a width. In this case, at least one of the plurality of stirring gas blowing plugs may be arranged in the furnace bottom region excluding the band regions, but it is more preferable that all of the stirring gas blowing plugs are arranged in the furnace bottom region excluding the band regions.

Furthermore, if wear of the refractory of the electric furnace can be suppressed, non-operating time of the electric furnace can be shortened, time can be allocated to melting and reduction of the unreduced slag, and it becomes possible to further improve efficiency of the reduction and recovery of chromium oxide.

When the electric furnace 10 is viewed in a planar view from the central axis direction, as shown in FIG. 3, for example, three electrodes 15 are arranged at a central portion of a furnace main body 17 so as to form an equilateral triangle having respective centers thereof as vertices, and a refractory furnace wall 14 is provided at an inner surface of the furnace main body 17. Further, in the electric furnace 10 according to the present embodiment, temperature measuring units 30 that measure a temperature of a surface of the refractory furnace wall 14 are provided at positions facing the electrodes 15 in a radial direction of the furnace main body 17, which greatly receive radiant heat of the arcs generated between the metal raw material and the electrodes.

Figure 4:
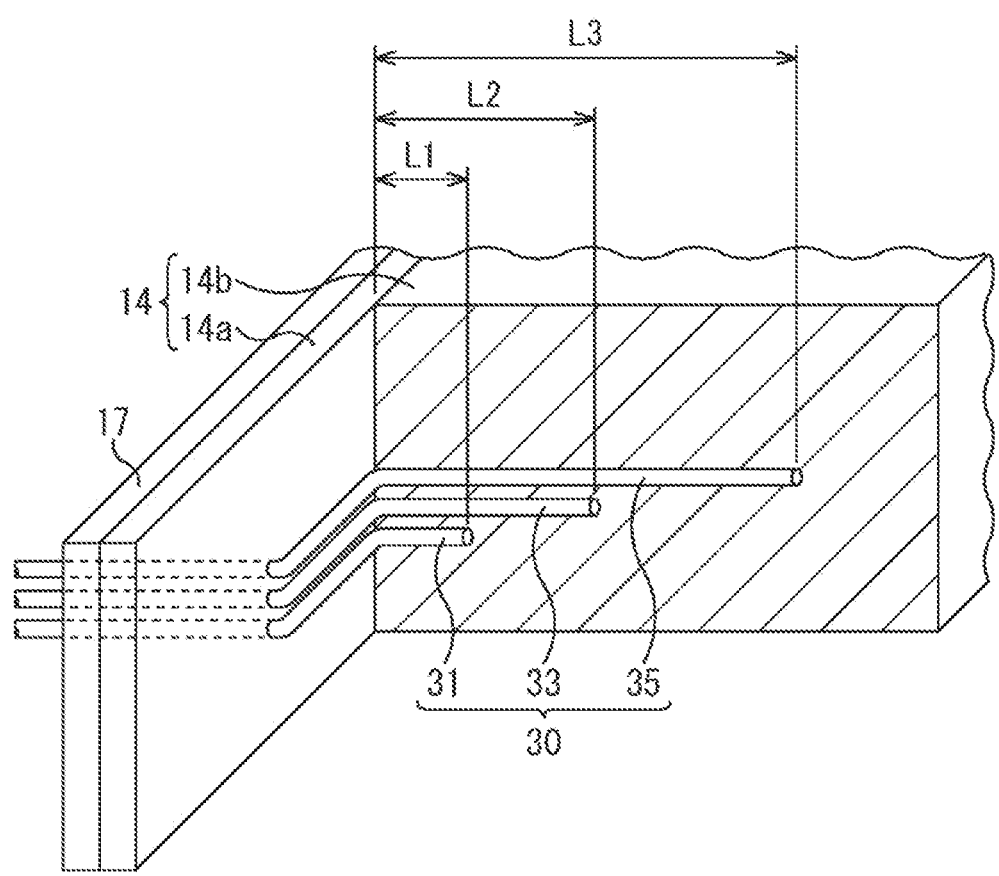
FIG. 4 is a partial perspective view showing an example of an installation state of a thermocouple for measuring a furnace internal temperature of an electric furnace.

As shown in FIG. 4, for example, each temperature measuring unit 30 is configured by three thermocouples 31, 33, and 35. The thermocouples 31, 33, and 35 are provided so as to penetrate the furnace body 17 and permanent refractory 14a and wear refractory 14b, which are constructed at the inner surface thereof, so that leading end portions are positioned inside the wear refractory 14b. The leading end portions of the respective thermocouples 31, 33, and 35 are arranged so that distances L1, L2, and L3 from a surface of the permanent refractory 14a in the radial direction of the furnace main body 17 are different. Due to this, a temperature distribution of the furnace inner wall surface at the position measured by the temperature measuring unit 30 can be estimated. A temperature measurement value measured by the temperature measuring unit 30 is output to a control device 40 that controls operation of the electric furnace 10. It should be noted that, although the temperature measuring unit 30 in the present embodiment is configured by the three thermocouples 31, 33, and 35, it is sufficient if the temperature measuring unit 30 is configured by a plurality of thermocouples, without being limited to this example.

Temperature measurement values measured by the thermocouples 31, 33, and 35 are output to the control device 40. The control device 40 calculates a temperature gradient in a refractory thickness direction based on these temperature measurement values and estimates a surface temperature of the refractory furnace wall 14. By obtaining the temperature gradient in the refractory thickness direction in this manner, the surface temperature of the refractory furnace wall 14 can be estimated more accurately based on the temperature gradient. It should be noted that the acquisition of the surface temperature of the refractory furnace wall 14 is not limited to such a method, and, for example, a method of directly measuring the surface temperature or another appropriate surface temperature estimation method may be used.

Further, the electric furnace 10 in the present embodiment can also measure a heat flux from the surface of the refractory furnace wall 14 to the furnace main body interior. The heat flux can be acquired by, for example, the temperature measuring unit 30 shown in FIG. 3 in a similar manner as the aforementioned measurement of the surface temperature of the refractory furnace wall. The temperature measurement values measured by the plurality of thermocouples 31, 33, and 35 installed so that the leading end portions are located at different positions in the refractory thickness direction of the refractory furnace wall 14 are output to the control device 40. The control device 40 calculates the temperature gradient in the refractory thickness direction based on these temperature measurement values and estimates the heat flux from the surface of the refractory furnace wall 14 to the interior of the furnace main body 10. For example, the temperature gradient is calculated at a predetermined sampling time (for example, an arbitrary time of 300 seconds or less), and the heat flux is estimated. Alternatively, the heat flux may be calculated by performing inverse problem analysis in heat transfer from time-course change of the temperature measurement values at two points using any two temperature measurement values from among the thermocouples 31, 33, and 35. It should be noted that the heat flux is not limited to this method, and other appropriate surface temperature estimation methods and heat flux estimation methods may be used.

The heat flux is acquired based on the temperature measurement values of each of the three temperature measuring units 30. Then, the maximum heat flux at each charge is determined from the obtained heat flux.

Next, operating conditions in the electric furnace 10 in the present embodiment will be explained. In the present embodiment, for example, a separate charge of converter slag generated by decarburization processing (oxidation refining) in a converter, which is a subsequent process, is charged into the electric furnace as unreduced slag containing Cr oxide after oxidation refining. Accordingly, out-of-system discharge of converter slag becomes zero, and since slag to be discharged to the outside of the system is generated only in the electric furnace, a total slag generation amount in the entire smelting process can be reduced. It should be noted that the decarburization processing in the converter in the subsequent process can be performed under known conditions.

<Mass Ratio of Metallic Si Amount to Cr Oxide Amount: 0.30 to 0.40>

First, when a charged material containing one of ferrochrome containing metallic Si or ferrosilicon, Cr oxide, and unreduced slag is charged into the electric furnace, and these are melted, they are mixed so that a mass ratio defined by the metallic Si amount/the Cr oxide amount becomes 0.30 to 0.40 on the premise that the unreduced slag is reduced with metallic silicon. It should be noted that, when the charged material is melted in the electric furnace, the ferrochrome containing metallic Si and/or ferrosilicon and, in accordance with necessity, other auxiliary raw materials are also charged, but that the auxiliary raw materials will be described later. Further, in a case in which the ferrochrome containing metallic Si and ferrosilicon are used, the metallic Si amount refers to an amount of metallic silicon contained in the ferrosilicon and ferrochrome. It should be noted that, although only ferrosilicon may be used as the metallic Si source, from the viewpoint of making the ratio of the metallic Si amount/the Cr oxide amount 0.40 or less, it is preferable to use only ferrochrome containing metallic Si, or to use ferrochrome containing metallic Si and ferrosilicon in combination.

When the mass ratio defined by the metallic Si amount/the Cr oxide amount is less than 0.30, the metallic silicon amount is insufficient under conditions premised on a heating rate, which will be described later, the amount of chromium oxide in the slag generated in the electric furnace becomes relatively large, and reduction of chromium cannot be carried out efficiently. On the other hand, when the mass ratio defined by the metallic Si amount/the Cr oxide amount exceeds 0.40, the silicon amount in the chromium-containing molten iron that is produced increases, and the converter slag amount that is generated in the oxidation refining process in the converter, which is a subsequent process, increases. In the present embodiment, in a case in which, for example, the entire amount of converter slag is refluxed to the electric furnace in order to suppress an out-of-system discharge amount of slag, this leads to both an increase in the amount of slag that is refluxed and an increase in the amount of chromium oxide that is refluxed. For this reason, in the processing in the electric furnace, the amount of metallic silicon that is used increases according to the increased amount of slag and the increased amount of chromium oxide, leading resultantly to an increase in the slag generation amount in the electric furnace, and a disadvantage occurs such that the slag amount in the electric furnace increases together with an increase in the number of operations.

<C Concentration: 2.0% by Mass or Greater>

The C concentration is set to 2.0% by mass or greater for the purpose of improving the efficiency of reduction and recovery of chromium oxide. The upper limit of the C concentration is not particularly limited, but is substantially equal to or less than a saturation concentration according to the Cr concentration. It should be noted that the saturation concentration of carbon differs depending on the Cr concentration. For example, when the Cr concentration is 0% by mass, the saturation concentration of carbon is about 4.4% by mass, and for ordinary chromium-containing steel having a Cr concentration of about 10%, it is about 5.5% by mass. In the reduction reaction of chromium oxide in slag by metallic silicon, the activity of silicon is a factor that affects the reduction reaction, but by setting the C concentration to 2.0% by mass or greater, the activity of silicon can be maintained at a high level, and the reduction reaction can be suitably promoted. Carbon is contained in carbon materials such as coke and coal, or in ferrochrome, and the C concentration can be set to 2.0% by mass or greater by adjusting the charging amounts thereof.

Next, the temperature conditions in the electric furnace will be described. In the present embodiment, assuming normal electric furnace operation, the attainment temperature is set according to the components of the molten metal produced in the electric furnace and convenience of processing from the electric furnace process onward. That is to say, the attainment temperature in the heating and melting in the electric furnace is approximately 1400 to 1700° C.

<Average Heating Rate in any 80° C. Interval from 1300° C. to the Attainment Temperature>

Assuming the above-mentioned concentration conditions, it is necessary to specify a temperature range in which the reduction reaction of chromium oxide is likely to occur. Thus, the temperature may be retained during the temperature rise, but by specifying the condition of an average heating rate in any 80° C. interval from 1300° C. to the attainment temperature (1400 to 1700° C.), rapid heating and retention of the temperature for an extremely long time period are eliminated. Here, the temperatures in the "attainment temperature" and the "average heating rate" indicate the molten metal temperature. There are various methods for obtaining the molten metal temperature, and although the estimated value from the measurement values of the thermocouples embedded in the furnace wall refractory is used as the molten metal temperature in the present embodiment, in a case in which an electric furnace in which thermocouple meters are not embedded in the furnace wall refractory is used, a measurement value by a consumable thermocouple or a radiation thermometer can be adopted.

<Maximum Average Heating Rate: 15.0° C./Min or Less>

The maximum average heating rate for any 80° C. interval from 1300° C. to the attainment temperature is 15.0° C./min or less. That is to say, in the span from 1300° C. to the attainment temperature, the average heating rate within an 80° C. interval is set so as not to exceed 15.0° C./min regardless of where the 80° C. interval is delimited. In a case in which the maximum average heating rate exceeds 15.0° C./min, the temperature is raised to near the attainment temperature before the unreduced slag that has been charged is sufficiently melted. In this case, the reduction processing is performed in a high temperature region where it is difficult for reduction of chromium oxide to proceed in terms of equilibrium theory, the reduction of chromium oxide becomes insufficient, and the recovery rate of chromium decreases. Furthermore, a large amount of metallic silicon that has not been consumed in the reduction reaction remains in the chromium-containing molten iron, the generation amount of converter slag in the oxidation refining process increases, and the slag amount in the electric furnace resultantly increases as described above.

<Minimum Average Heating Rate: 3.0° C./Min or Greater>

Further, the minimum average heating rate for any 80° C. interval from 1300° C. to the attainment temperature is 3.0° C./min or greater. That is to say, in the span from 1300° C. to the attainment temperature, the average heating rate within an 80° C. interval is set so as not to be less than 3.0° C./min regardless of where the 80° C. interval is delimited. In a case in which the minimum average heating rate is less than 3.0° C./min, a large amount of time is required to raise the temperature to the attainment temperature. If a large amount of time is required, metallic silicon will be oxidatively lost, to that extent, due to oxygen in air that inevitably infiltrates into the electric furnace. As a result, there will be a shortage of metallic silicon, and the reduction of chromium oxide will be insufficient. Alternatively, if metallic silicon for the amount of oxidation loss is additionally charged, the consumption amount of silicon in the electric furnace will increase, and the slag generation amount in the electric furnace will increase.

As described above, by setting the mass ratio of the metallic Si amount/the Cr oxide amount in the charged material that is charged to the electric furnace and the C concentration to within predetermined ranges, and further setting the average heating rate in any 80° C. interval from 1300° C. to the attainment temperature to a predetermined condition, chromium can be efficiently recovered, and the amount of slag discharged outside of the system can be suppressed. It should be noted that, in the present disclosure, sampling at temperatures in the "any 80° C. interval" is used as a reference in order to avoid a rapid temperature rise and to achieve a gentle temperature rise. Furthermore, preferably, as described later, if the unreduced slag can be rapidly melted by controlling a particle size of the auxiliary raw material to be charged and the slag component after processing, chromium can be recovered even more efficiently by the reduction of chromium oxide.

<Other Charged Material Charged to the Electric Furnace (Auxiliary Raw Material)>

The above-mentioned auxiliary raw material refers to charged material other than the metal raw material (ferrochrome, ferrosilicon, scrap, etc.), and, in addition to the converter slag (unreduced slag), oxides (quick lime, silica stone, magnesia, alumina, decommissioning materials, metal oxides), carbonates (limestone, dolomite), and hydroxides (metal or semi-metal hydroxides) are included in examples of the auxiliary raw material. These can be charged into the electric furnace as needed.

In this auxiliary raw material, by setting a mass ratio of auxiliary raw material having a sieve mesh size over 25 mm (hereinafter, in some cases, referred to as "lump auxiliary raw material"), which is difficult to heat and melt, with respect to the entire charged material, and a mass ratio of auxiliary raw material having a sieve mesh size under 3.15 mm (hereinafter, in some cases, referred to as "fine auxiliary raw material"), which is easy to heat and melt, with respect to the total charged material, to predetermined conditions, chromium can be recovered even more efficiently. It should be noted that the aforementioned sieve mesh size over 25 mm and the aforementioned sieve mesh size under 3.15 mm respectively refer to that which remains on the sieve of a plate sieve having a nominal opening of 25 mm and that which is below the sieve of a plate sieve having a nominal opening of 3.15 mm in JIS Z8801-2: 2000.

<Mass Ratio of Auxiliary Raw Material Having a Sieve Mesh Size Over 25 mm with Respect to the Entire Charged Material: 5 to 30% by Mass>

The mass ratio of the auxiliary raw material having a sieve mesh size over 25 mm with respect to the entire charged material is preferably 5 to 30% by mass. The mass ratio of the auxiliary material having a sieve mesh size over 25 mm with respect to the charged material is specified in order to specify the composition of auxiliary raw material that is difficult to heat and melt. It should be noted that a part or the entirety of the lump auxiliary raw material, which is difficult to melt, is unreduced slag.

In the unreduced slag, which is partially or entirely contained in the lump auxiliary raw material, the chromium oxide in the slag is melted, and the reduction reaction of the chromium oxide by molten iron changes from a solid-liquid reaction to a liquid-liquid reaction. As a result, a chromium reduction capacity coefficient, which is an index of the reduction reaction of the chromium oxide, is greatly improved from about 0.01 (1/min) to 0.05 (1/min) or greater, and the reduction reaction can be efficiently progressed. It should be noted that the chromium reduction capacity coefficient is a value representing a change in the concentration of chromium oxide per unit of time and is an index of the ease of progression of the reduction reaction. If the mass ratio of the auxiliary raw material having a sieve mesh size over 25 mm with respect to the entire charged material is less than 5% by mass, it is difficult to obtain the effect thereof. Further, if the mass ratio of the auxiliary raw material having a sieve mesh size over 25 mm with respect to the entire charged material exceeds 30% by mass, it takes a large amount of time for heating and melting, and the efficiency of the reduction reaction tends to decrease.

<Mass Ratio of Auxiliary Raw Material Having a Sieve Mesh Size Under 3.15 mm with Respect to the Entire Charged Material: 3.0% by Mass or Greater>

On the other hand, the mass ratio of the auxiliary raw material having a sieve mesh size under 3.15 mm with respect to the entire charged material is preferably 3.0% by mass or greater. The auxiliary raw material having a sieve mesh size under 3.15 mm melts easily after heating and promotes melting of the lump auxiliary raw material. If the mass ratio of the fine auxiliary raw material with respect to the entire charged material is 3.0% by mass or greater, the fine auxiliary raw material will be present around the lump auxiliary raw material after the fine auxiliary raw material has been melted and can contribute to promotion of heating and melting of the lump auxiliary raw material, also including the stirring action by the arc jet flow of the electric furnace. If the mass ratio of the auxiliary raw material having a sieve mesh size under 3.15 mm with respect to the entire charged material is less than 3.0% by mass, the effect thereof cannot be sufficiently obtained. Further, although the upper limit is not particularly specified, even if the fine auxiliary raw material is added in an amount exceeding 25% by mass with respect to the entire charged material, the effect thereof will be saturated. It should be noted that the fine auxiliary raw material may or may not contain unreduced slag.

<Mass Ratio of Metal Raw Material>

The metal raw material (solid material or melted material of scrap, alloy iron, and grain iron) is preferably contained in an amount of 45% by mass or greater with respect to the entire charged material, considering electrical conductivity in the electric furnace. Here, the charged material is composed of the aforementioned auxiliary raw material and the metal raw material, and therefore, since the fine auxiliary raw material is 3% by mass or greater and the lump auxiliary raw material is 5% by mass or greater, the metal raw material is preferably 92% by mass or less with respect to the entire charged material.

As described above, even if a large amount of the lump auxiliary raw material is present, the heating and melting of the lump auxiliary raw material can be promoted by containing the fine auxiliary raw material in a certain proportion. Furthermore, after the reduction processing, in a case in which preferable viscosity conditions for slag can be secured due to the attainment temperature, the C concentration, and the Si concentration satisfying formula (1) to be described later, and by satisfying formula (2) to be described later, the reduction of chromium can be more preferably realized.

<C Concentration and Si Concentration in the Molten Iron after Reduction Processing>

In order to further improve the recovery rate of chromium, it is preferable that the C concentration and the Si concentration in the molten iron after the reduction processing satisfy the condition of the following formula (1).

$$[C] \geq -29.4 + 0.015 \times (T+273) - 0.003 \times (T+273) \times \log[Si] \quad (1)$$

Here, [C] and [Si] respectively represent the C concentration and the Si concentration in % by mass in the molten iron, and T represents the attainment temperature (° C.). It is possible to adjust the C concentration and the Si concentration by controlling the addition amounts of a carbon source and a silicon source in the charged material. As the carbon source, carbon materials such as coke and coal, carbon content contained in ferrochrome, or the like can be used. As the silicon source, ferrosilicon, metallic silicon, silicon content contained in ferrochrome, or the like can be used.

<CaO Concentration, $SiO_2$ Concentration, and $Al_2O_3$ Concentration in Slag after Reduction Processing>

Furthermore, when the CaO concentration, the $SiO_2$ concentration and the $Al_2O_3$ concentration in the slag after the reduction processing satisfy the following formula (2), it becomes possible to reduce the chromium oxide more efficiently. By adding a CaO source and an $Al_2O_3$ source to the electric furnace as charged material, the slag composition can be controlled to an appropriate region (that is to say, the range of formula (2)). Here, as the CaO source, CaO content contained in quick lime, limestone, dolomite, or the like can be used. Further, for the $Al_2O_3$ source, $Al_2O_3$ content contained in aluminum ash, high alumina brick, secondary refining slag, or the like can be used.

$$0.04 \leq (CaO)/\{(SiO_2) \times (Al_2O_3)\} \leq 0.20 \quad (2)$$

Here, (CaO), ($SiO_2$), and ($Al_2O_3$) respectively represent the CaO concentration, the $SiO_2$ concentration, and the $Al_2O_3$ concentration in % by mass in the slag after the reduction processing.

In order to efficiently recover the chromium content from unreduced slag containing a high concentration of chromium oxide in an electric furnace having weak stirring power, the viscosity has a large effect together with the meltability of the slag, and it is essential to endeavor to reduce the viscosity together with melting of the slag. It is generally known that the viscosity of this slag increases when $Al_2O_3$ is added to basic slag and decreases when $Al_2O_3$ is added to acidic slag (for example, refer to Handbook of iron and steel, 3rd Edition, Vol. I, p. 43).

By conducting various reduction experiments on slag containing chromium oxide, the present inventors have been able to define an appropriate region according to "(CaO)/{($SiO_2$)×($Al_2O_3$)}", which is known as the Mannessmann Index (hereinafter, M.S.I.), instead of according to "(CaO)/{($SiO_2$)+($Al_2O_3$)}", which is a simple basicity index, as a condition for efficient recovery of chromium content from slag.

As the M.S.I. of the slag described above increases, the viscosity of the slag can decrease. That is to say, by setting the M.S.I. to 0.04 or greater, the $Cr_2O_3$ concentration in the slag, which was a high concentration of more than 30% by mass before the reduction processing, is reduced to a low concentration of less than 10% by mass after the reduction processing, and this is preferable since reduction can be carried out more efficiently. On the other hand, when the M.S.I. exceeds 0.20, the melting point of the slag is remarkably increased, the melting of the slag is inhibited, and the reduction rate of chromium is greatly reduced. Accordingly, in order to secure the reduction rate of chromium, the M.S.I. is preferably set to 0.20 or less.

<$Al_2O_3$ Concentration and Fluorine Concentration, in Terms of $CaF_2$ Equivalent, in Slag after Reduction Processing>

More preferably, from the viewpoint of slag properties, by setting the $Al_2O_3$ concentration in the slag after the reduction processing to an appropriate range, it is possible to melt the slag without substantially using fluorine, and to reduce the chromium oxide more efficiently. Here, substantially no use of fluorine means that elution of fluorine from the slag after the reduction processing is not significantly observed, and although this refers to a case in which the slag composition after the reduction processing has a CaF$_2$ equivalent of 0.5% by mass or less, it is more preferable if this is 0.3% by mass or less.

In order to lower the melting point of the slag and improve the reduction rate of chromium oxide, it is preferable to set the Al$_2$O$_3$ concentration in the slag after the reduction processing to 5.0% by mass or greater. On the other hand, if the Al$_2$O$_3$ concentration exceeds 30.0% by mass, the effect of promoting the reduction of chromium oxide by melting of the slag cannot be expected, the cost of the alumina source will be high, and therefore, it is preferable to set the Al$_2$O$_3$ concentration to 30.0% by mass or less.

As described above, by controlling the particle size of the auxiliary raw material and the slag components after the processing, it is possible to quickly melt the unreduced slag. As a result, it is possible to suppress oxidation loss of metallic silicon caused by oxygen in air that inevitably infiltrates into the electric furnace, and it is possible to further improve the efficiency of reduction and recovery of chromium oxide.

Next, stirring conditions during operation in the electric furnace will be described. Furthermore, preferably, if the unreduced slag can be melted more quickly by efficiently carrying out stirring by bottom blowing, it is possible to further improve the efficiency of the reduction and recovery of chromium oxide.

<Stirring Power Density>

When efficiently reducing chromium oxide in the slag, there is an appropriate range for the stirring power density during operation in the electric furnace. The stirring power density can be controlled by stirring gas (bottom blowing gas) from the stirring gas blowing plugs. By setting the stirring power density to 0.01 kW/ton or greater, it is possible to obtain a stirring effect for efficient reduction of chromium oxide. On the other hand, if the stirring power density exceeds 1.0 kW/ton, the stirring gas may blow through the molten metal and not contribute to stirring. In addition, the molten metal surface fluctuates sharply, and although operation is possible, the refractory may be noticeably damaged or the like. Therefore, the stirring power density is preferably set to 1.0 kW/ton or less.

When carrying out stirring of the molten metal by the stirring gas in the electric furnace, the stirring power density c for each stirring gas blowing plug is expressed by the following formula (3). Accordingly, the total of the stirring power densities for each stirring gas blowing plug is the stirring power density of the electric furnace.

$$\varepsilon = (0.371 \times Q \times T_l/W) \times [\ln\{1+(9.8 \times \rho_l \times h)/P_a\} + \eta(1-T_n/T_l)] \quad (3)$$

Here, ε is the stirring power density (kW/ton), Q is the stirring gas flow rate (Nm$^3$/sec), $T_l$ is the temperature (K) of the molten iron, W is the mass (ton) of the molten iron, $T_n$ is the stirring gas temperature (K), $\rho_l$ is the density (kg/m$^3$) of the molten iron, h is the bath depth (m) at the stirring gas blowing plugs, $P_a$ is the atmospheric pressure (Pa), and η is the contribution of the temperature expansion term (=0.06).

As described above, by carrying out stirring efficiently, it is possible to melt the unreduced slag more quickly. As a result, it is possible to suppress oxidation loss of metallic silicon caused by oxygen in air that inevitably infiltrates into the electric furnace, and it is possible to further improve the efficiency of reduction and recovery of chromium oxide.

Further, from the viewpoint of suppressing damage to the refractory, it is preferable to satisfy the following conditions during operation in the electric furnace.

<Maximum Attainment Temperature for the Surface Temperature of the Refractory Furnace Wall in One Charge>

First, it is preferable to set the maximum attainment temperature for the surface temperature of the refractory furnace wall in one charge to 1000° C. or higher and 1800° C. or lower. The surface temperature of the refractory furnace wall can be measured according to the method described above. When the maximum attainment temperature exceeds 1800° C., the surface temperature of the refractory furnace wall approaches the melting point of the refractory, and the strength is markedly reduced. When the strength of the refractory furnace wall is reduced, erosion of the refractory furnace wall becomes remarkable due to dispersal of molten metal or slag. Accordingly, it is preferable to set the surface temperature of the refractory furnace wall to 1800° C. or lower. On the other hand, if the maximum attainment temperature is set to less than 1000° C., high productivity cannot be obtained. Consequently, it is preferable that the maximum attainment temperature is set to 1000° C. or higher.

<Heat Flux from the Surface of the Refractory Furnace Wall to the Interior>

Further, when the surface temperature of the refractory furnace wall is in the range of 1000° C. or higher and 1800° C. or lower, it is preferable to set the heat flux from the surface of the refractory furnace wall to the furnace main body interior to 150 Mcal/m$^2$/hr or less. The heat flux from the surface of the refractory furnace wall to the furnace main body interior can be measured according to the method described above.

Although the range in which the surface temperature of the refractory furnace wall is 1000° C. or higher and 1800° C. or lower is a range in which erosion of the refractory due to contact with molten metal or slag does not remarkably occur, the strength of the refractory furnace wall itself decreases. Therefore, when the surface temperature of the refractory furnace wall is in the range of 1000° C. or higher and 1800° C. or lower, if the temperature suddenly rises due to contact with molten metal or slag, a difference in thermal expansion occurs locally, and thermal stress that is similar to spalling is generated. Accordingly, if an abrupt rise in the surface temperature of the refractory furnace wall occurs when the surface temperature of the refractory furnace wall is in the range of 1000° C. or higher and 1800° C. or lower, this induces cracking of the refractory furnace wall, and wear becomes remarkable.

In the range in which the surface temperature of the refractory furnace wall is 1000° C. or higher and 1800° C. or lower, wear of the refractory furnace wall due to the above-described difference in thermal expansion can be suppressed if the heat flux is 150 Mcal/m$^2$/hr or less. Since the temperature gradient is gentle in the low region in which the heat flux is 150 Mcal/m$^2$/hr or less, the local thermal expansion difference is small, and generation of thermal stress is also small. Accordingly, it becomes more difficult for cracks to occur in the refractory furnace wall. On the other hand, when the heat flux exceeds 150 Mcal/m$^2$/hr, there is a tendency for generation of cracks in the refractory furnace wall to become remarkable, resulting in a refractory wear rate that frequently requires repair of the refractory furnace wall. Accordingly, in the range in which the surface temperature of the refractory furnace wall is 1000° C. or higher and 1800° C. or lower, the lifespan of the refractory furnace wall can be improved by operating the electric furnace so that the heat flux is 150 Mcal/m$^2$/hr or less.

As described above, by operating the electric furnace so as to satisfy the aforementioned operating conditions for the surface temperature of the refractory furnace wall and the heat flux, the electric furnace can be operated with high power in the possible range while suppressing wear of the refractory furnace wall. Further, since the electric furnace can be operated with high power within the possible range, the operating time can be shortened. As a result, wear of the refractory furnace wall can be further suppressed, heat dissipation loss from the furnace wall and the like can be reduced, and production costs can be reduced. As a result, oxidation loss of metallic silicon caused by oxygen in air that inevitably infiltrates into the electric furnace can be suppressed, and it is possible to further improve the efficiency of reduction and recovery of chromium oxide.

EXAMPLES

Next, examples of the present disclosure will be described; however, the conditions in the examples are one example of conditions adopted for confirming the operability and effects of the present disclosure, and the present disclosure is not limited by this one example of conditions. The present disclosure may adopt various conditions as long as the object of the present disclosure is achieved without deviating from the gist of the present disclosure.

First Example

In the present experiment, when charging a metal raw material into an arc-type electric furnace to smelt molten iron, slag containing chromium oxide was added, and the chromium oxide in the slag was reduced to recover chromium in the molten iron. It should be noted that, when adding the $Al_2O_3$ source, alumina ash was added before the start of energization, and that, when adding quick lime as the CaO source, it was added from an upper hopper during melting. Further, when stirring of the molten metal was carried out, bottom-blown Ar gas was blown in as the stirring gas, and the stirring power density was calculated based on formula (3). The experiment conditions are shown below.

1) Electric Furnace

Here, the experiment was carried out using an arc-type electric furnace (arc-type melting furnace) capable of smelting 100 tons of molten metal and having a configuration as shown in FIGS. 1 to 4. The experiment was carried out with the number of stirring gas blowing plugs arranged at the furnace bottom being 3, 4, or 6, and in Example 12, all of the stirring gas blowing plugs were installed at positions other than the band regions to carry out the experiment. Further, three electrodes having a diameter of 24 inches were used, the diameter (PCD) of a circle passing through centers of the respective electrodes when viewed in a planar view from a central axis was set to 1.8 m, and the furnace internal diameter was set to 6.1 m. The distance (electrode height) from the static molten metal surface of the molten iron to the leading ends of the electrodes was 0.3 m on average for the three electrodes.

2) Mixing of Electric Furnace Charged Material

Metal raw material: 55 tons in total (55% by mass of the entire charged material) In the experiment, scrap, cast iron (solidified blast furnace hot metal), and alloy iron (ferrochrome), which are metal raw materials containing a carbon source and a silicon source, were used.

Auxiliary raw material: 45 tons in total (45% by mass of the entire charged material)

The breakdown comprised a total amount of 43 tons (43% by mass of the electric furnace charged material) of unreduced slag (converter slag) containing 33 to 39% by mass of $Cr_2O_3$ produced by decarburization processing of a separate charge in a converter, and among the aforementioned unreduced slag, the lump auxiliary raw material having a sieve mesh size of over 25 mm was set to from 5 to 35 tons, and the fine auxiliary raw material having a sieve mesh size of under 3.15 mm was set to from 0.1 to 25 tons.

The remainder of the auxiliary raw material was an $Al_2O_3$ source (aluminum ash) and a CaO source (quick lime) which have an intermediate particle size (a sieve mesh size of over 3.15 mm and a sieve mesh size under 25 mm).

The mass ratio defined by the metallic Si amount/the Cr oxide amount was set to from 0.2 to 0.5.

3) Energization Conditions

Three arc electrodes, 40 MW, and the total energization time was constant at 60 minutes.

4) Operating Conditions

In the heating and melting, the attainment temperature was set to from 1400 to 1700° C. The maximum and minimum average heating rates in any 80° C. interval from 1300° C. to the attainment temperature were set to the conditions shown in Table 1 below. It should be noted that, for temperatures in the "attainment temperature" and the "average heating rate", molten metal temperatures estimated from measurement values of the thermocouples embedded in the refractory furnace wall were used.

The slag composition after reduction processing "(CaO)/$\{(SiO_2) \times (Al_2O_3)\}$" (listed as C/S·A in the tables) was set to from 0.01 to 0.25.

The $Al_2O_3$ concentration in the slag after the reduction processing was set to from 4.5 to 30% by mass.

The stirring power density was set to from 0.00 to 1.5 kW/ton. It should be noted that the stirring power density is the total value of the stirring power densities for each stirring gas blowing plug of formula (3) described above. Further, "0 kW/ton" means a condition in which the stirring gas (bottom blown gas) is not blown in.

<Evaluation Criteria>

The experiment was carried out under the above conditions, and evaluation was made based on the two items of chromium reducibility and slag generation amount.

As an index for determining the quality of chromium reducibility, "$Cr_2O_3/Cr$ (% by mass ratio) after reduction processing" was used. This is a value obtained by calculating the $Cr_2O_3$ concentration in the slag after the reduction processing with respect to the Cr concentration in the molten iron after the reduction processing, and means that, the smaller this value is, the more efficiently the reduction processing is performed. Here, if the value is 0.5 or less, it is considered that chromium was efficiently recovered. For the evaluation results, less than 0.05 was evaluated as AA, 0.05 or greater and less than 0.2 was evaluated as A, 0.2 or greater and 0.5 or less was evaluated as B, and greater than 0.5 was evaluated as C.

The total slag amount of a slag generation amount after reduction processing in the electric furnace and a slag generation amount after refining in the converter in the subsequent process was used as an evaluation index of the slag generation amount. For evaluation, Comparative Example 1 was designated as a standard (100%), a case in which the total slag amount was reduced to less than 85% of the standard was evaluated as A, a case in which it was from 85% to 95% of the standard was evaluated as B, and a case in which it was equivalent to Comparative Example 1 (less than ±5%) or worsened was evaluated as C.

TABLE 1-1

| | | Charging Conditions (1) | | Charging Conditions (2) Auxiliary Raw Material Mixing Ratio by Particle Size | | Judgement for [C] Inequality (1) (After Reduction Processing) | | | | |
|---|---|---|---|---|---|---|---|---|---|---|
| | | Average Heating Rate | | Si/Cr Oxide | Carbon Concen- | Sieve Mesh Size less | Sieve Mesh Size | [C] ≥ f([Si], T) Established | [C] % | [Si] % | Attain- ment Temper- | Right Side of |
| Index Unit Range | | Maxi- mum ° C./min ≤15.0 | Mini- mum ° C./min ≥3.0 | (mass ratio) 0.30-0.40 | tration % by mass ≥2.0 | than 3.15 mm % by mass ≥3.0 | exceeding 25 mm % by mass 5-30 | Y: established N: not established | by mass | by mass | ature ° C. 1400- 1700 | Formula (1) |
| Com- par- ative Ex- ample | 1 | 20.0 | 3.1 | 0.40 | 2.1 | 3.1 | 29 | Y | 1.7 | 3.2 | 1405 | −6.8 |
| | 2 | 14.9 | 2.0 | 0.35 | 2.6 | 3.5 | 27 | Y | 1.6 | 1.4 | 1412 | −4.8 |
| | 3 | 14.8 | 3.2 | 0.20 | 2.4 | 3.4 | 29 | Y | 1.5 | 0.4 | 1420 | −2.1 |
| | 4 | 14.7 | 3.5 | 0.50 | 2.3 | 3.3 | 28 | Y | 1.8 | 3.1 | 1415 | −6.6 |
| | 5 | 14.0 | 3.4 | 0.39 | 1.1 | 3.6 | 25 | Y | 0.8 | 2.8 | 1407 | −6.4 |
| Ex- ample | 1 | 14.4 | 3.3 | 0.38 | 2.1 | 3.1 | 26 | Y | 1.8 | 1.6 | 1406 | −5.2 |
| | 2 | 12.0 | 3.1 | 0.39 | 2.2 | 3.2 | 27 | Y | 1.8 | 1.3 | 1409 | −4.7 |
| | 3 | 14.6 | 6.0 | 0.39 | 2.3 | 3.4 | 28 | Y | 1.9 | 1.5 | 1402 | −5.2 |
| | 4 | 14.8 | 3.3 | 0.30 | 2.1 | 3.5 | 27 | Y | 2.0 | 0.7 | 1418 | −3.2 |
| | 5 | 14.7 | 3.1 | 0.40 | 3.9 | 3.4 | 26 | Y | 3.8 | 1.5 | 1411 | −5.0 |
| | 6 | 14.2 | 3.2 | 0.40 | 2.3 | 24.9 | 15 | Y | 1.7 | 1.5 | 1403 | −5.2 |
| | 7 | 14.6 | 3.5 | 0.38 | 2.4 | 3.3 | 5 | Y | 1.6 | 1.2 | 1408 | −4.7 |
| | 8 | 14.7 | 3.4 | 0.39 | 2.3 | 3.4 | 27 | Y | 1.8 | 1.7 | 1404 | −5.4 |
| | 9 | 14.9 | 3.3 | 0.38 | 2.1 | 3.6 | 23 | Y | 1.5 | 1.6 | 1412 | −5.1 |
| | 10 | 14.5 | 3.1 | 0.40 | 2.6 | 3.2 | 24 | Y | 1.7 | 1.5 | 1409 | −5.1 |
| | 11 | 14.7 | 3.2 | 0.39 | 2.5 | 3.5 | 25 | Y | 1.8 | 1.4 | 1404 | −5.0 |
| | 12 | 14.3 | 3.6 | 0.39 | 2.4 | 3.1 | 29 | Y | 1.9 | 1.4 | 1417 | −4.8 |
| | 13 | 14.1 | 3.4 | 0.40 | 2.5 | 3.6 | 28 | Y | 1.4 | 1.5 | 1411 | −5.1 |
| | 14 | 14.3 | 3.1 | 0.38 | 2.2 | 0.1 | 29 | Y | 1.6 | 1.8 | 1408 | −5.5 |
| | 15 | 14.6 | 3.5 | 0.39 | 2.4 | 3.2 | 35 | Y | 1.7 | 2.1 | 1410 | −5.8 |
| | 16 | 14.2 | 3.1 | 0.30 | 2.3 | 3.6 | 28 | N | 0.3 | 0.9 | 1690 | 0.37 |
| | 17 | 14.5 | 3.2 | 0.39 | 2.1 | 3.4 | 27 | Y | 1.8 | 2.4 | 1405 | −6.1 |
| | 18 | 14.3 | 3.4 | 0.38 | 2.4 | 3.4 | 28 | Y | 1.9 | 2.2 | 1420 | −5.7 |
| | 19 | 14.4 | 3.3 | 0.38 | 2.3 | 3.2 | 29 | Y | 1.7 | 1.8 | 1416 | −5.3 |
| | 20 | 14.8 | 3.6 | 0.40 | 2.4 | 3.3 | 27 | Y | 1.6 | 2.3 | 1408 | −6.0 |
| | 21 | 14.2 | 3.2 | 0.40 | 2.1 | 3.1 | 29 | Y | 1.7 | 2.3 | 1403 | −6.1 |
| | 22 | 14.3 | 3.4 | 0.39 | 2.1 | 3.5 | 28 | Y | 1.9 | 2.1 | 1415 | −5.8 |
| | 23 | 14.1 | 3.3 | 0.40 | 2.2 | 3.4 | 28 | Y | 2.0 | 2.3 | 1406 | −6.0 |

TABLE 1-2

| | | Slag Composition (After Processing) | | Bottom Blowing Conditions | | | | | | |
|---|---|---|---|---|---|---|---|---|---|---|
| | | | | Plug | | Band Region Bottom Blowing | Stirring Power Density kW/ton | | | Slag Amount Overall |
| Index Unit Range | | C/S · A 0.04-0.20 | Al$_2$O$_3$ % by mass 5.0-30.0 | Plugs number | Number Density number/m$^2$ ≥0.12 | Plug Distance L/ Depth H ≥0.50 | | | Cr Reducibility | Evaluation |
| Com- par- ative Ex- ample | 1 | 0.05 | 5.1 | 4 | 0.14 | 0.50 | Yes | 0.01 | C | B |
| | 2 | 0.04 | 5.6 | 4 | 0.14 | 0.50 | Yes | 0.01 | C | B |
| | 3 | 0.04 | 5.4 | 4 | 0.14 | 0.50 | Yes | 0.01 | C | B |
| | 4 | 0.04 | 6.4 | 4 | 0.14 | 0.50 | Yes | 0.01 | A | B |
| | 5 | 0.05 | 5.2 | 4 | 0.14 | 0.50 | Yes | 0.01 | C | B |
| Ex- ample | 1 | 0.04 | 5.5 | 4 | 0.14 | 0.50 | Yes | 0.01 | A | B |
| | 2 | 0.04 | 6.1 | 4 | 0.14 | 0.50 | Yes | 0.01 | AA | A |
| | 3 | 0.06 | 5.1 | 4 | 0.14 | 0.50 | Yes | 0.01 | AA | A |
| | 4 | 0.05 | 5.3 | 4 | 0.14 | 0.50 | Yes | 0.01 | A | A |
| | 5 | 0.04 | 5.2 | 4 | 0.14 | 0.50 | Yes | 0.01 | AA | A |
| | 6 | 0.05 | 5.8 | 4 | 0.14 | 0.50 | Yes | 0.01 | AA | A |
| | 7 | 0.04 | 5.4 | 4 | 0.14 | 0.50 | Yes | 0.01 | AA | A |
| | 8 | 0.2 | 5.7 | 4 | 0.14 | 0.50 | Yes | 0.01 | A | A |
| | 9 | 0.04 | 29.9 | 4 | 0.14 | 0.50 | Yes | 0.01 | A | A |
| | 10 | 0.04 | 6.2 | 6 | 0.22 | 0.50 | Yes | 0.01 | AA | A |
| | 11 | 0.04 | 5.5 | 4 | 0.14 | 0.60 | Yes | 0.01 | AA | A |
| | 12 | 0.05 | 5.2 | 4 | 0.14 | 0.50 | No | 0.01 | AA | A |
| | 13 | 0.05 | 5.1 | 4 | 0.14 | 0.50 | Yes | 1.0 | AA | A |
| | 14 | 0.04 | 5.9 | 4 | 0.14 | 0.50 | Yes | 0.01 | B | A |
| | 15 | 0.05 | 5.4 | 4 | 0.14 | 0.50 | Yes | 0.01 | B | A |

TABLE 1-2-continued

| | Slag Composition (After Processing) | | Bottom Blowing Conditions | | | | | | |
|---|---|---|---|---|---|---|---|---|---|
| | | | Plug | | Band | Stirring | | | |
| Index Unit Range | C/S · A 0.04-0.20 | Al$_2$O$_3$ % by mass 5.0-30.0 | Plugs number | Number Density number/m$^2$ ≥0.12 | Plug Distance L/ Depth H ≥0.50 | Region Bottom Blowing No | Power Density kW/ton 0.01-1.0 | Cr Reducibility | Slag Amount Overall Evaluation |
| 16 | 0.04 | 5.2 | 4 | 0.14 | 0.50 | Yes | 0.01 | B | A |
| 17 | 0.01 | 5.1 | 4 | 0.14 | 0.50 | Yes | 0.01 | B | A |
| 18 | 0.25 | 5.6 | 4 | 0.14 | 0.50 | Yes | 0.01 | B | A |
| 19 | 0.06 | 4.5 | 4 | 0.14 | 0.50 | Yes | 0.01 | B | A |
| 20 | 0.06 | 5.1 | 3 | 0.11 | 0.50 | Yes | 0.01 | B | A |
| 21 | 0.05 | 5.7 | 4 | 0.14 | 0.40 | Yes | 0.01 | B | A |
| 22 | 0.04 | 5.4 | 4 | 0.14 | 0.50 | Yes | 0 | B | A |
| 23 | 0.04 | 5.2 | 4 | 0.14 | 0.50 | Yes | 1.5 | B | A |

As can be seen from Table 1, in Examples 1 to 23, all of the maximum and minimum average heating rates, the mass ratio defined by the metallic Si amount/the Cr oxide amount, and the C concentration are satisfied, and the chromium reducibility and the slag generation amount are both superior to those of Comparative Example 1.

On the other hand, in Comparative Example 1, since the maximum average heating rate in any 80° C. interval from 1300° C. to the attainment temperature was too large, the temperature was raised to near the attainment temperature before the charged unreduced slag was sufficiently melted. Consequently, the reduction of chromium oxide was insufficient, the recovery rate of chromium decreased, moreover, a large amount of metallic silicon that was not consumed in the reduction reaction remained in the chromium-containing molten iron, and the slag generation amount after refining in the converter in the subsequent process increased.

In Comparative Example 2, since the minimum average heating rate in any 80° C. interval from 1300° C. to the attainment temperature was too small, metallic silicon was oxidatively lost, to that extent, due to oxygen in air that inevitably infiltrated into the electric furnace, the amount of metallic silicon was insufficient, and the reduction of chromium oxide became insufficient. Further, since the reduction reaction became insufficient, the amount of chromium oxide in the slag produced in the electric furnace relatively increased, and, to that extent, the slag generation amount also increased.

In Comparative Example 3, since the amount of metallic silicon was relatively small, the reduction reaction became insufficient, the amount of chromium oxide in the slag produced in the electric furnace relatively increased, and, to that extent, the slag generation amount also increased.

In Comparative Example 4, since the amount of metallic silicon was relatively large, the reduction reaction was efficiently and sufficiently carried out, but the Si concentration in the molten iron became high, and the slag generation amount after refining in the converter in the subsequent process increased.

In Comparative Example 5, since the carbon concentration was too low, the activity of silicon could not be maintained at a high level, the reduction reaction became insufficient, the amount of chromium oxide in the slag produced in the electric furnace relatively increased, and, to that extent, the slag generation amount also increased.

Second Example

Operation was repeated under the same conditions as the charges described in Example 1 and Comparative Example 1 in Table 1, and the electric furnace was operated for one month. For the examples and comparative examples shown in Table 2 below, the electric furnace was operated under the aforementioned operating conditions, and the wear state of the refractory furnace wall and the productivity were evaluated. It should be noted that, in the examples and comparative examples shown in Table 1, the maximum temperature of the refractory furnace wall surface was 1200 to 2000° C., and the maximum heat flux of the refractory furnace wall surface was 20 to 150 Mcal/m$^2$/hr.

The results of verifying the effectiveness of the operating method of the electric furnace of the present disclosure are shown below. The evaluation criteria for the wear of the refractory furnace wall, the productivity for one charge, and the productivity for one month are as follows.

[Evaluation Criteria for Refractory Furnace Wall Wear]

Evaluation according to the wear rate calculated from the wear amount per one charge calculated from the maximum wear amount after operation for 100 to 200 ch A: Wear rate of less than 1.5 mm/ch B: Wear rate of 1.5 mm/ch or greater

[Evaluation Criteria for Productivity for One Charge]

Evaluation according to the melting time of the metal raw material per one charge AA: Time from the start of energization to the end of energization was less than 75 minutes A: Time from the start of energization to the end of energization was 75 minutes or greater and less than 90 minutes B: Time from the start of energization to the end of energization was 90 minutes or greater

[Evaluation Criteria for Productivity for One Month]

A: Designating Comparative Example 1 as the standard, the production increasing amount improved by 5% or greater.

B: Designating Comparative Example 1 as the standard, the production increasing amount was less than 5%

[Evaluation Criteria for Slag Amount for One Month]

Comparative Example 1 was designated as a standard (100%), a case in which the total slag amount was reduced to less than 85% of the standard was evaluated as AA, a case in which it was from 85% to 95% of the standard was evaluated as A, and a case in which it was equivalent to Comparative Example 1 (less than ±5%) or worsened was evaluated as B.

TABLE 2

Ranges of Various Values in Respective Charges Carried out over One Month

| | | Maximum Attainment Temperature of Refractory Furnace Wall Surface (° C.) | Maximum Heat Flux of Refractory Furnace Wall Surface (Mcal/m²/hour) | Wear State of Furnace Wall | Productivity | | Evaluation Axis One Month Slag Amount |
|---|---|---|---|---|---|---|---|
| | | | | | One Charge | One Month | |
| Comparative Example | 1 | 1200 to 2000 | 20 to 150 | B | AA | B | B |
| | 11 | 1000 to 1800 | 40 to 250 | B | AA | B | B |
| | 12 | 400 to 950 | 0 to 150 | A | B | B | B |
| | 13 | 1000 to 1800 | 40 to 150 | A | A | A | B |
| Example | 1 | 1200 to 2000 | 20 to 150 | B | AA | B | A |
| | 31 | 1000 to 1800 | 40 to 250 | B | AA | B | A |
| | 32 | 400 to 950 | 0 to 150 | A | B | B | A |
| | 33 | 1000 to 1800 | 40 to 150 | A | A | A | AA |

With regard to the operating conditions that are not described in Table 2, Examples 31 to 33 are the same as Example 1 in Table 1, and Comparative Examples 11 to 13 are the same as Comparative Example 1 in Table 1.

In Example 1, there was a charge in which the maximum attainment temperature exceeded 1800° C., and in Example 31, there was a charge in which the maximum heat flux exceeded 150 Mcal/m²/hr. Therefore, although the productivity per one charge was good compared with that of Example 33, the wear rate of the refractory furnace wall was large, and the refractory repair time per one month increased.

In Example 33, the maximum attainment temperature for each charge was within the range of from 1000° C. to 1800° C., and the maximum heat flux was 150 Mcal/m²/hr or less. As a result of operating the electric furnace in this manner, the wear of the refractory furnace wall, the productivity for one charge, and the productivity for one month were all good, and as a result, the slag generation amount in one month could be reduced more than in Example 1.

On the other hand, in Comparative Examples 11 to 13, the maximum average heating rate exceeded 15.0° C./min, and the slag amount was equivalent to that of Comparative Example 1 or worsened.

EXPLANATION OF REFERENCE NUMERALS

10 Electric furnace
11 Furnace center
12 Furnace bottom
13 Stirring gas blowing plugs
14 Refractory furnace wall
15 Electrodes
17 Furnace main body
30 Temperature measuring units
31, 33, 35 Thermocouples
40 Control device The disclosure of Japanese Patent Application No. 2019-080179, filed on Apr. 19, 2019, is incorporated into the present specification by reference in its entirety. All documents, patent applications, and technical standards described in the present specification are incorporated into the present specification by reference to the same extent as if the individual documents, patent applications, and technical standards were specifically and individually described.

The invention claimed is:

1. A method for producing chromium-containing molten iron, the method comprising:

charging, into an electric furnace, a charged material containing a metal raw material of at least one of ferrochrome containing metallic Si or ferrosilicon containing metallic Si, and unreduced slag containing Cr oxide generated by oxidative refining, as a mixture in which a mass ratio of an amount of the metallic Si, which is an amount of metallic silicon contained in the metal raw material, to an amount of the Cr oxide is from 0.30 to 0.40, and a C concentration is in a range of from 2.0% by mass to a saturation concentration; and after the charging, producing molten iron containing Cr obtained due to the Cr oxide undergoing reduction processing, such that, when the charged material is heated and melted in the electric furnace, an attainment temperature is set to from 1400° C. to 1700° C., a maximum average heating rate in any 80° C. interval from 1300° C. to the attainment temperature is set to 15.0° C./min or less, and a minimum average heating rate in any 80° C. interval from 1300° C. to the attainment temperature is set to 3.0° C./min or greater.

2. The method for producing chromium-containing molten iron according to claim 1, wherein:

the charged material includes a carbon source, a silicon source, a CaO source, and an $Al_2O_3$ source, and, among the charged material, material other than the metal raw material is an auxiliary raw material;

a content of the auxiliary raw material having a sieve mesh size of over 25 mm is 5% by mass or greater and 30% by mass or less with respect to the entire charged material, and a content of the auxiliary raw material having a sieve mesh size of under 3.15 mm is 3.0% by mass or greater with respect to the entire charged material; and the charged material is charged into the electric furnace such that the C concentration and an Si concentration in the molten iron after the reduction processing satisfy conditions of the following formula (1), and such that a relationship between a CaO concentration, an $SiO_2$ concentration and an $Al_2O_3$ concentration in the slag after the reduction processing satisfies conditions of the following formula (2):

$$[C] \geq -29.4 + 0.015 \times (T+273) - 0.003 \times (T+273) \times \log [Si] \quad (1)$$

$$0.04 \leq (CaO)/\{(SiO_2) \times (Al_2O_3)\} \leq 0.20 \quad (2)$$

wherein, [C] and [Si] respectively represent the C concentration in % by mass and the Si concentration in % by mass, in the molten iron after the reduction processing, (CaO), ($SiO_2$) and ($Al_2O_3$) respectively represent the CaO concentration in % by mass, the $SiO_2$ concentration in % by mass, and the $Al_2O_3$ concentration in % by mass, in the slag after the reduction processing, and T represents the attainment temperature (° C.).

3. The method for producing chromium-containing molten iron according to claim 2, wherein a fluorine concentration, in terms of $CaF_2$ equivalent, in the slag after the reduction processing is 0.5% by mass or less, and the $Al_2O_3$ concentration is 5.0% by mass or greater and 30.0% by mass or less.

4. The method for producing chromium-containing molten iron according to claim 3, wherein 0.12 or more stirring gas blowing plugs per 1 $m^2$ of molten metal surface area are arranged at a furnace bottom of the electric furnace, and, when a distance between centers of adjacent stirring gas blowing plugs is designated as L, and a molten metal depth from the furnace bottom to the molten metal surface is designated as H, L/H is 0.50 or greater.

5. The method for producing chromium-containing molten iron according to claim 3, wherein:
 the electric furnace comprises three electrodes; and
 viewing the electric furnace in a planar view from a central axis direction, a furnace center is arranged at a center of gravity of a triangle having respective centers of the three electrodes as vertices, and, viewing the electric furnace in a planar view from the central axis direction and assuming band regions each having a virtual line extending from the furnace center through a center of a respective one of the three electrodes to a furnace wall as a center line and having a diameter of the electrode as a width, stirring gas blowing plugs are positioned at a furnace bottom region excluding the band regions.

6. The method for producing chromium-containing molten iron according to claim 3, wherein a stirring power density during operation of the electric furnace is 0.01 kW/ton or greater and 1.0 kW/ton or less.

7. The method for producing chromium-containing molten iron according to claim 3, wherein the charged material that is charged into the electric furnace is melted such that a maximum attainment temperature for a surface temperature of a refractory furnace wall of the electric furnace in one charge is 1000° C. or higher and 1800° C. or lower, and such that, when the surface temperature of the refractory furnace wall is in a range of 1000° C. or higher and 1800° C. or lower, a heat flux from a surface of the refractory furnace wall to a furnace main body interior is 150 $Mcal/m^2/hr$ or less.

8. The method for producing chromium-containing molten iron according to claim 2, wherein 0.12 or more stirring gas blowing plugs per 1 $m^2$ of molten metal surface area are arranged at a furnace bottom of the electric furnace, and, when a distance between centers of adjacent stirring gas blowing plugs is designated as L, and a molten metal depth from the furnace bottom to the molten metal surface is designated as H, L/H is 0.50 or greater.

9. The method for producing chromium-containing molten iron according to claim 2, wherein:
 the electric furnace comprises three electrodes; and
 viewing the electric furnace in a planar view from a central axis direction, a furnace center is arranged at a center of gravity of a triangle having respective centers of the three electrodes as vertices, and, viewing the electric furnace in a planar view from the central axis direction and assuming band regions each having a virtual line extending from the furnace center through a center of a respective one of the three electrodes to a furnace wall as a center line and having a diameter of the electrode as a width, stirring gas blowing plugs are positioned at a furnace bottom region excluding the band regions.

10. The method for producing chromium-containing molten iron according to claim 2, wherein a stirring power density during operation of the electric furnace is 0.01 kW/ton or greater and 1.0 kW/ton or less.

11. The method for producing chromium-containing molten iron according to claim 2, wherein the charged material that is charged into the electric furnace is melted such that a maximum attainment temperature for a surface temperature of a refractory furnace wall of the electric furnace in one charge is 1000° C. or higher and 1800° C. or lower, and such that, when the surface temperature of the refractory furnace wall is in a range of 1000° C. or higher and 1800° C. or lower, a heat flux from a surface of the refractory furnace wall to a furnace main body interior is 150 $Mcal/m^2/hr$ or less.

12. The method for producing chromium-containing molten iron according to claim 1, wherein 0.12 or more stirring gas blowing plugs per 1 $m^2$ of molten metal surface area are arranged at a furnace bottom of the electric furnace, and, when a distance between centers of adjacent stirring gas blowing plugs is designated as L, and a molten metal depth from the furnace bottom to the molten metal surface is designated as H, L/H is 0.50 or greater.

13. The method for producing chromium-containing molten iron according to claim 12, wherein:
 the electric furnace comprises three electrodes; and
 viewing the electric furnace in a planar view from a central axis direction, a furnace center is arranged at a center of gravity of a triangle having respective centers of the three electrodes as vertices, and, viewing the electric furnace in a planar view from the central axis direction and assuming band regions each having a virtual line extending from the furnace center through a center of a respective one of the three electrodes to a furnace wall as a center line and having a diameter of the electrode as a width, the stirring gas blowing plugs are positioned at a furnace bottom region excluding the band regions.

14. The method for producing chromium-containing molten iron according to claim 12, wherein a stirring power density during operation of the electric furnace is 0.01 kW/ton or greater and 1.0 kW/ton or less.

15. The method for producing chromium-containing molten iron according to claim 12, wherein the charged material that is charged into the electric furnace is melted such that a maximum attainment temperature for a surface temperature of a refractory furnace wall of the electric furnace in one charge is 1000° C. or higher and 1800° C. or lower, and such that, when the surface temperature of the refractory furnace wall is in a range of 1000° C. or higher and 1800° C. or lower, a heat flux from a surface of the refractory furnace wall to a furnace main body interior is 150 $Mcal/m^2/hr$ or less.

16. The method for producing chromium-containing molten iron according to claim 1, wherein:
 the electric furnace comprises three electrodes; and
 viewing the electric furnace in a planar view from a central axis direction, a furnace center is arranged at a center of gravity of a triangle having respective centers of the three electrodes as vertices, and, viewing the electric furnace in a planar view from the central axis direction and assuming band regions each having a virtual line extending from the furnace center through a center of a respective one of the three electrodes to a furnace wall as a center line and having a diameter of the electrode as a width, stirring gas blowing plugs are positioned at a furnace bottom region excluding the band regions.

17. The method for producing chromium-containing molten iron according to claim 16, wherein a stirring power density during operation of the electric furnace is 0.01 kW/ton or greater and 1.0 kW/ton or less.

18. The method for producing chromium-containing molten iron according to claim 16, wherein the charged material that is charged into the electric furnace is melted such that a maximum attainment temperature for a surface temperature of a refractory furnace wall of the electric furnace in one charge is 1000° C. or higher and 1800° C. or lower, and such that, when the surface temperature of the refractory furnace wall is in a range of 1000° C. or higher and 1800° C. or lower, a heat flux from a surface of the refractory furnace wall to a furnace main body interior is 150 Mcal/m$^2$/hr or less.

19. The method for producing chromium-containing molten iron according to claim 1, wherein a stirring power density during operation of the electric furnace is 0.01 kW/ton or greater and 1.0 kW/ton or less.

20. The method for producing chromium-containing molten iron according to claim 1, wherein the charged material that is charged into the electric furnace is melted such that a maximum attainment temperature for a surface temperature of a refractory furnace wall of the electric furnace in one charge is 1000° C. or higher and 1800° C. or lower, and such that, when the surface temperature of the refractory furnace wall is in a range of 1000° C. or higher and 1800° C. or lower, a heat flux from a surface of the refractory furnace wall to a furnace main body interior is 150 Mcal/m$^2$/hr or less.

* * * * *